(12) United States Patent
Troy

(10) Patent No.: US 10,803,848 B1
(45) Date of Patent: Oct. 13, 2020

(54) AUDIO INSTRUMENT WITH THREE-DIMENSIONAL LOCALIZATION

(71) Applicant: THE BOEING COMPANY, Chicago, IL (US)

(72) Inventor: James J. Troy, Issaquah, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 16/691,639

(22) Filed: Nov. 22, 2019

(51) Int. Cl.
   *G10K 11/28* (2006.01)
   *G10L 25/51* (2013.01)
   *G01S 3/801* (2006.01)
   *G06T 7/20* (2017.01)
   *H04R 1/34* (2006.01)

(52) U.S. Cl.
   CPC .............. *G10K 11/28* (2013.01); *G01S 3/801* (2013.01); *G06T 7/20* (2013.01); *G10L 25/51* (2013.01); *H04R 1/34* (2013.01)

(58) Field of Classification Search
   CPC .......... G10K 11/28; H04R 1/34; H04R 1/342; H04R 1/345; H04R 1/406; H04R 2201/401; H04R 2201/403
   USPC .................................. 381/56, 160, 360, 361
   See application file for complete search history.

(56) References Cited

U.S. PATENT DOCUMENTS

| | | | |
|---|---|---|---|
| 7,859,655 B2 | 12/2010 | Troy | |
| 8,744,133 B1 | 6/2014 | Troy | |
| 2007/0165866 A1* | 7/2007 | Super | H04R 29/00 381/1 |
| 2016/0195856 A1* | 7/2016 | Spero | G05B 15/02 700/90 |
| 2017/0071190 A1* | 3/2017 | Lewis | G10L 17/26 |

* cited by examiner

*Primary Examiner* — Melur Ramakrishnaiah
(74) *Attorney, Agent, or Firm* — The Small Patent Law Group LLC; Philip S. Hof

(57) ABSTRACT

An audio instrument includes a component assembly, a pan-tilt mechanism, and one or more processors. The component assembly includes a parabolic reflector, an audio device, and a sensor unit. The audio device is configured to one or more of receive or transmit sound waves via a transducer element disposed within a communication envelope of the parabolic reflector. The sensor unit includes a distance measurement sensor. The pan-tilt mechanism orients the component assembly at independent angular rotations about two orthogonal axes relative to a support platform. The one or more processors are configured to control the pan-tilt mechanism to orient the component assembly such that a central axis of the parabolic reflector is aimed towards a specific three-dimensional location for targeted audio communication between the audio device and a target at the specific three-dimensional location.

23 Claims, 7 Drawing Sheets

AUDIO INSTRUMENT WITH THREE-DIMENSIONAL LOCALIZATION

FIELD

The present disclosure generally relates to audio instruments that transmit and/or receive sound waves, and more particularly to instruments that direct the transmission of sound waves to and/or the receipt of sound waves from specific three-dimensional locations.

BACKGROUND

There are numerous types of electronic systems capable of performing audio communication including audio transmission and reception. However, most electronic audio communication systems require communicating parties to possess a personal communication device, such as a mobile phone, radio transceiver, and the like. In some situations it may be desirable or necessary to communicate over moderately large distances or through moderately loud environments to someone who does not have a compatible communication device on them, as a result audio communication with that person may be difficult. One alternative is a parabolic microphone unit that can direct sound waves using an attached parabolic reflector. However, it may be difficult to accurately aim the parabolic microphone unit at the target recipient or source of the audio signal, especially over moderately large distances.

SUMMARY

Certain embodiments of the present disclosure provide an audio instrument that includes a component assembly, a pan-tilt mechanism, and one or more processors. The component assembly includes a parabolic reflector, an audio device, and a sensor unit. The audio device is configured to one or more of receive or transmit sound waves via a transducer element of the audio device disposed within a communication envelope of the parabolic reflector. The sensor unit includes a distance measurement sensor. The pan-tilt mechanism is configured to orient the component assembly at independent angular rotations about two orthogonal axes relative to a support platform. The one or more processors are communicatively connected to the pan-tilt mechanism and the component assembly. The one or more processors are configured to control the pan-tilt mechanism to orient the component assembly such that a central axis of the parabolic reflector is aimed towards a specific three-dimensional location for targeted audio communication between the audio device and a target at the specific three-dimensional location.

Certain embodiments of the present disclosure provide an audio instrument that includes a component assembly and a pan-tilt mechanism. The component assembly includes a distance measurement sensor, a parabolic reflector, and an audio device. The audio device is configured to one or more of receive or transmit sound waves via a transducer element of the audio device disposed within a communication envelope of the parabolic reflector. The pan-tilt mechanism is configured to orient the component assembly at independent angular rotations about two orthogonal axes relative to a support platform for targeted audio communications. The parabolic reflector is fixed in location relative to the distance measurement sensor and is oriented relative to the distance measurement sensor such that a central axis of the parabolic reflector is offset from and parallel to a sight axis of the distance measurement sensor.

Certain embodiments of the present disclosure provide a method for targeted audio communications that includes calibrating a location of an audio instrument to a target coordinate system by controlling a pan-tilt mechanism of the audio instrument to sequentially aim a distance measurement sensor of the audio instrument towards at least three calibration point positions within the target coordinate system to measure respective linear distances between the distance measurement sensor and each of the calibration point positions. The method includes controlling, via one or more processors, the pan-tilt mechanism to orient a parabolic reflector of the audio instrument such that a central axis of the parabolic reflector is aimed towards a specific coordinate position defined in the target coordinate system. The method also includes one or more of (i) receiving sound emitted from the specific coordinate position at the audio instrument or (ii) transmitting sound from the audio instrument to the specific coordinate position.

DETAILED DESCRIPTION

Figure 1A:
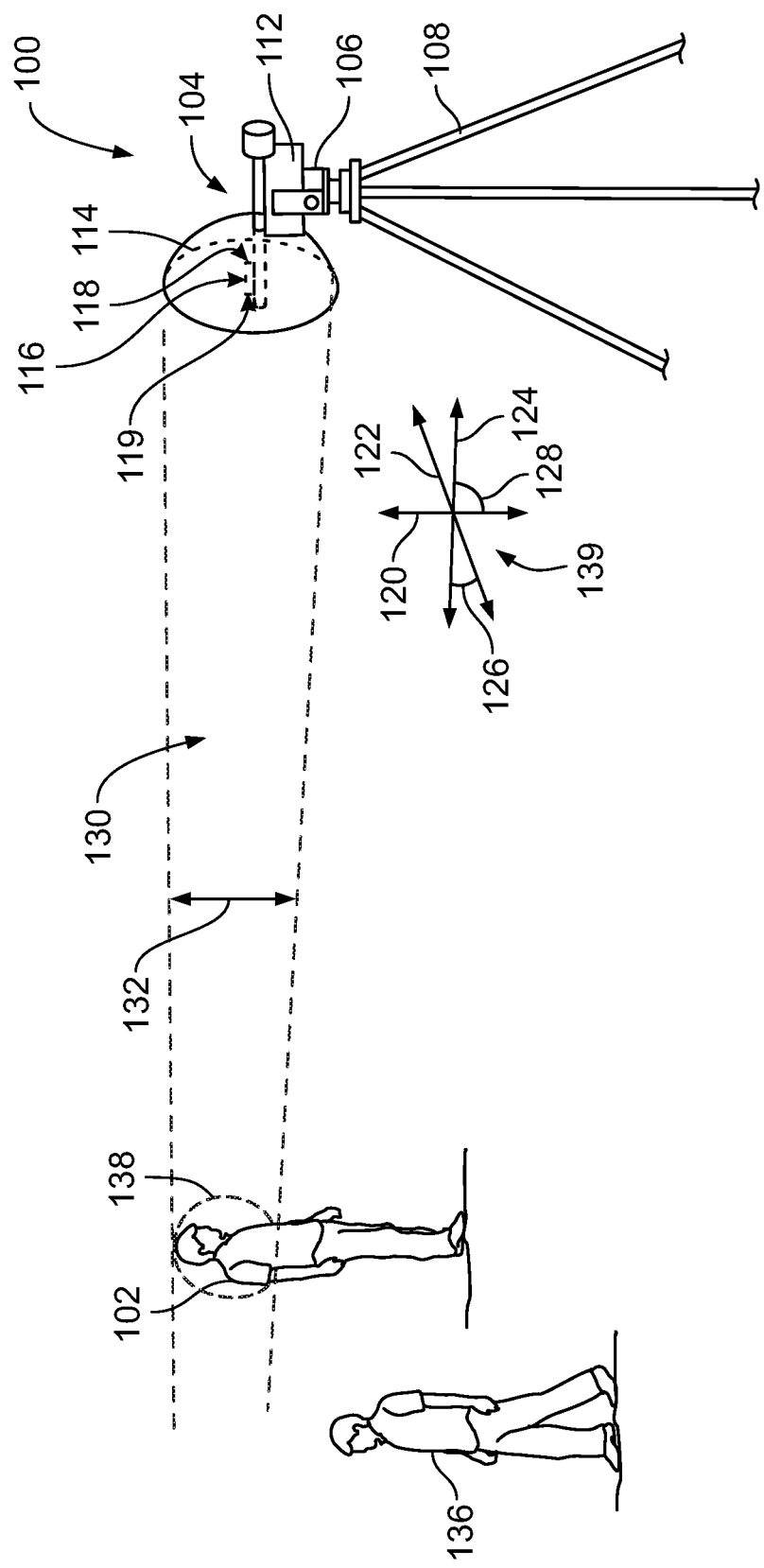
FIG. 1A illustrates an audio instrument according to an embodiment of the present disclosure.

The foregoing summary, as well as the following detailed description of certain embodiments, will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

A need exists for an audio instrument that can accurately and reliably focus on a communication target, even over moderately large distances, for exchanging audio communications with the target without the target possessing a personal communication device. With those needs in mind, certain embodiments of the present disclosure provide an audio instrument that uses three-dimensional (3-D) localization to communicate sound waves with a target. As used herein, sound communication can refer to either or both of the receipt of sound waves at the audio instrument and the transmission of sound waves from the audio instrument. As used herein, targets of the audio instrument may refer to people, objects (e.g., machines), areas (e.g., areas in front of a moving vehicle), or the like, without requiring a communication device (e.g., RF device such as a mobile phone) at the target. The audio instrument in the embodiments described herein is configured for two-way communications including the ability to transmit and receive audio.

In some application-specific uses, the audio instrument is controlled to provide two-way communications (e.g., talking and listening). For example, as described herein the audio instrument may be used as a relay for allowing to spaced-apart parties to communicate with each other across a distance via the audio instrument without the use of radio-frequency (RF) or cellular-based devices.

In other application-specific uses the audio instrument may be controlled to only transmit audio or only receive audio. For example, the audio instrument may be configured to direct sound waves representing command messages, notification messages, warning messages, and/or the like to the target for the target to react based on the received sound waves. In another example, the audio instrument may be configured to focus at a target for receiving sound waves emitted from the target. The audio instrument may analyze the sound waves received to monitor the target and/or scan an area. In an alternative embodiment, the audio instrument may be configured for one-way communications, such as transmitting audio (e.g., talking) or receiving audio (e.g., listening), but not both.

The audio instrument described herein includes a parabolic reflector to guide the propagation of sound waves through a medium, such as air or water. The audio instrument utilizes the parabolic reflector to focus on targets at specific locations in three- dimensional space. The specific locations may have, or may be based on, known coordinates defined in a target coordinate system. The audio instrument according to embodiments herein can calibrate the position and orientation (i.e., the location) of the audio instrument to the target coordinate system, which is used for focusing the parabolic reflector towards specific coordinate positions defined in the target coordinate system. For example, the audio instrument may be able to receive an input set of positional coordinates defined within the target coordinate system, and in response may automatically reorient the audio instrument to aim the parabolic reflector at a specific location in space that represents the input set of positional coordinates. Conversely, the audio instrument may be able to receive an input sound, via the parabolic reflector, and based on the orientation of the parabolic reflector can determine the specific location in space of the source of the input sound. Known audio systems that include parabolic reflectors are generally adjusted manually or in an automated fashion using an input device, such as a joystick. These audio systems may be able to generally point towards a designated target but are not able to automatically point directly at specific targets in space based on input positional coordinates defined within a coordinate system.

The audio instrument embodiments described herein may efficiently enable communication of sound between the audio instrument and one or more targets. The parabolic reflector directs the propagation of sound waves along a narrow beam in a specific direction towards the target and focuses received sound waves on an audio transducer. The specific targeting capability of the audio instrument may enable communications between two parties at reduced energy levels of the communicating parties than conventional methods of communication. For example, two people may be able to speak with each other over a relatively long distance without the use of mobile electronic devices and without having to shout to each other. Furthermore, the specific targeting capability of the audio instrument may enable communications over distances without the sound waves being received by people near the intended target but outside of the sound transmission path. Therefore, target-specific information, such as warnings, can be provided through air to intended persons or agents to inform or instruct the intended person or agent, for example, without disturbing other, non-intended persons that may be proximate to the intended persons or agents.

Conversely, by focusing on a specific target in space, the audio instrument can listen for sound emitted from the target while essentially filtering out or ignoring ambient noise, resulting in enhanced monitoring or scanning capabilities due to improved signal-to-noise ratios of the target-emitted sound waves. The specific targeting capability of the audio instrument also enables accurate and repeatable communication with an intended target. These and other benefits of the audio instrument are more fully described with reference to the drawings below.

FIG. 1A illustrates an audio instrument 100 according to an embodiment of the present disclosure, with the audio communicating instrument 100 focused on a target object 102 for audio communication with the target object 102. The audio instrument 100 may communicate with the target object 102 by transmitting (e.g., emitting and directing) audio signals in the form of sound waves (not shown) to the target object 102, receiving sound waves emitted from the target object 102, or both. The audio instrument 100 may communicate with the target object 102 by focusing on a specific, designated location 138 that is associated with the target object 102. The specific location 138 may be represented by positional coordinates defined in a coordinate system (e.g., a target coordinate system 139). The location of the audio instrument 100 relative to the target coordinate system 139 may be determined via a calibration (e.g., localization) protocol performed by measurement components of the audio instrument 100. As such, the relative location of the audio instrument 100 relative to the target object 102 can be initially unknown, and the audio instrument 100 is not restricted in its placement relative to the target object 102.

Figure 1B:
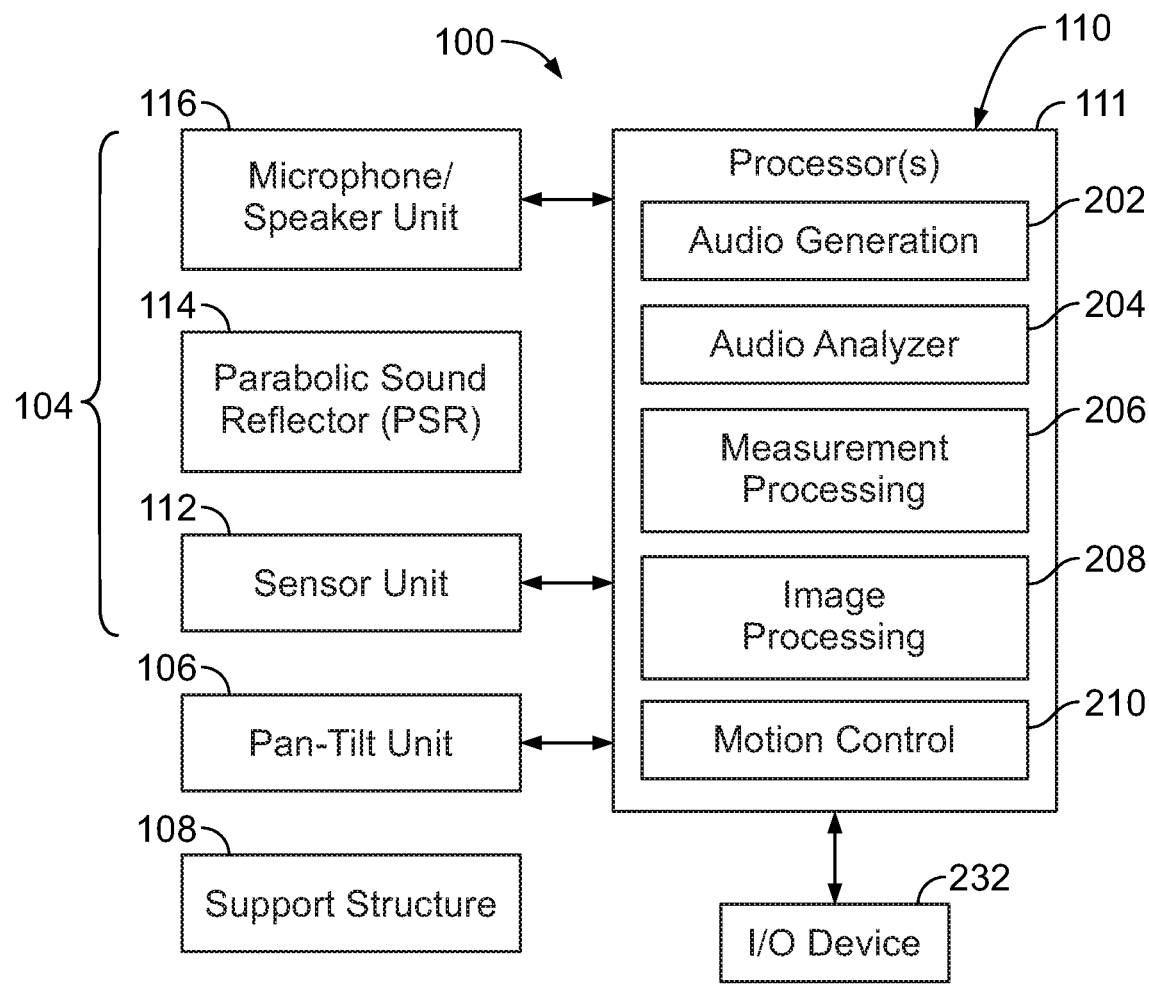
FIG. 1B illustrates a block diagram representing the audio instrument according to an embodiment.

The audio instrument 100 includes a component assembly 104, a pan-tilt mechanism 106, a support structure 108, and a control system 110 (shown in FIG. 1B). In other embodiments, the component assembly 104 may include other or fewer components. The component assembly 104 includes a sensor unit 112 (which includes at least one sensor device, such as a distance measurement sensor, not shown), a parabolic reflector 114, an audio device 116 (best shown in FIG. 2), an actuator, and/or the like. The audio device 116 is configured to transmit sounds, receive sounds, or both. For example, the audio device 116 may include an audio output hardware circuitry, such as a speaker, for generating and transmitting sound waves and/or an audio input hardware circuitry, such as a microphone, for receiving sound waves. The audio device 116 can be an assembly that includes at least one transducer element 118 (best shown in FIG. 2), electrical elements (e.g., wires, not shown), and the like. The transducer element 118 converts acoustic energy into electrical energy (as an audio receiver or microphone) and/or electrical energy into acoustic energy (as an audio emitter or speaker). The transducer element 118 may be internally disposed within an end segment 119 (best shown in FIG. 2) of the audio device 116 to protect the transducer element 118 from dust, debris, contaminants, and the like. In the illustrate embodiment, the audio device 116 has both reception and transmission capabilities. In the present disclosure, terms for acoustic energy, such as sound, sound waves, and audio signals, are used interchangeably except as indicated.

The pan-tilt mechanism 106 is mounted between the component assembly 104 and the support structure 108. The pan-tilt mechanism 106 is configured to orient the component assembly 104 at different, controlled angular rotations relative to the support structure 108. The angular rotations are along a vertical (e.g., pan) axis 120 and a horizontal (e.g., tilt) axis 122 relative to the support structure 108. The axes 120, 122, are generally perpendicular to each other and perpendicular to a longitudinal axis 124. The pan-tilt mechanism 106 is configured to selectively orientate the audio component assembly 104 at different angular rotations about orthogonal axes 120 and 122, which constrain motion within two orthogonal planes, including a horizontal plane 126 defined by the horizontal axis 122 and the longitudinal axis 124 and a vertical plane 128 defined by the vertical axis 120 and the longitudinal axis 124.

The support structure 108 may be a tripod as shown in FIG. 1A, which folds up for storage and transportation. In an alternative embodiment, the audio instrument 100 may lack the support structure 108, and instead may be mounted to a discrete structure, such as a vehicle, a crane, a ceiling beam, or the like.

The target object 102 may be a person, a group of people, a device, an animal, a robot, or the like. In the illustrated embodiment, the target object 102 is a person. The person may be located a distance away from the audio instrument 100. The distance between the person and the audio instrument 100 may be 20 meters (m) (65.6 feet (ft)) or more for long-distance communications between the person and the audio instrument 100. In other example applications, the person or other target object can be located closer to the audio instrument 100. The audio instrument 100 is configured to communicate with the person along an envelope (e.g., a communication envelope) 130 extending from the parabolic reflector 114. As used herein, the communication envelope 130 refers to a volume in space that is defined by the propagation of sound waves emitted by the audio instrument 100 and reflected by the parabolic reflector 114. A width 132 of the envelope 130 may depend on dimensions of the parabolic reflector 114 and/or a position of the transducer element 118 of the audio device 116 relative to an inner surface 134 (shown in FIG. 2), or more specifically, relative to the focal point 160 (shown in FIG. 3) of the parabolic reflector 114.

In a sound transmission mode, the audio instrument 100 directs acoustic energy along the envelope 130 to the target person 102. The parabolic reflector 114 directs the sound waves to move in a substantially unidirectional path that is roughly the shape of the envelope 130. People and/or objects outside of the envelope 130, such as a second person 136 nearby the target person 102, may not be able to hear and/or process the acoustic energy transmitted by the instrument 100. In a sound reception mode, the audio instrument 100 can listen for sounds emitted from the target person 102. When listening, the envelope 130 defines the scope or size of the audio source received by the instrument 100. For example, the instrument 100 may more clearly receive sounds emitted from a source within the envelope 130 than sounds emitted from sources outside of the envelope 130. As a result, the instrument 100 may be able to focus on sounds emitted from the target person 102 and essentially ignore ambient noises. The ambient noises may include background noise, machine noises, the voices of other people (e.g., the person 136), and/or the like. Although the target object 102 is shown as a person in FIG. 1A, other targets can include machinery, vehicles, robots, areas within a facility, and/or the like.

Figure 2:
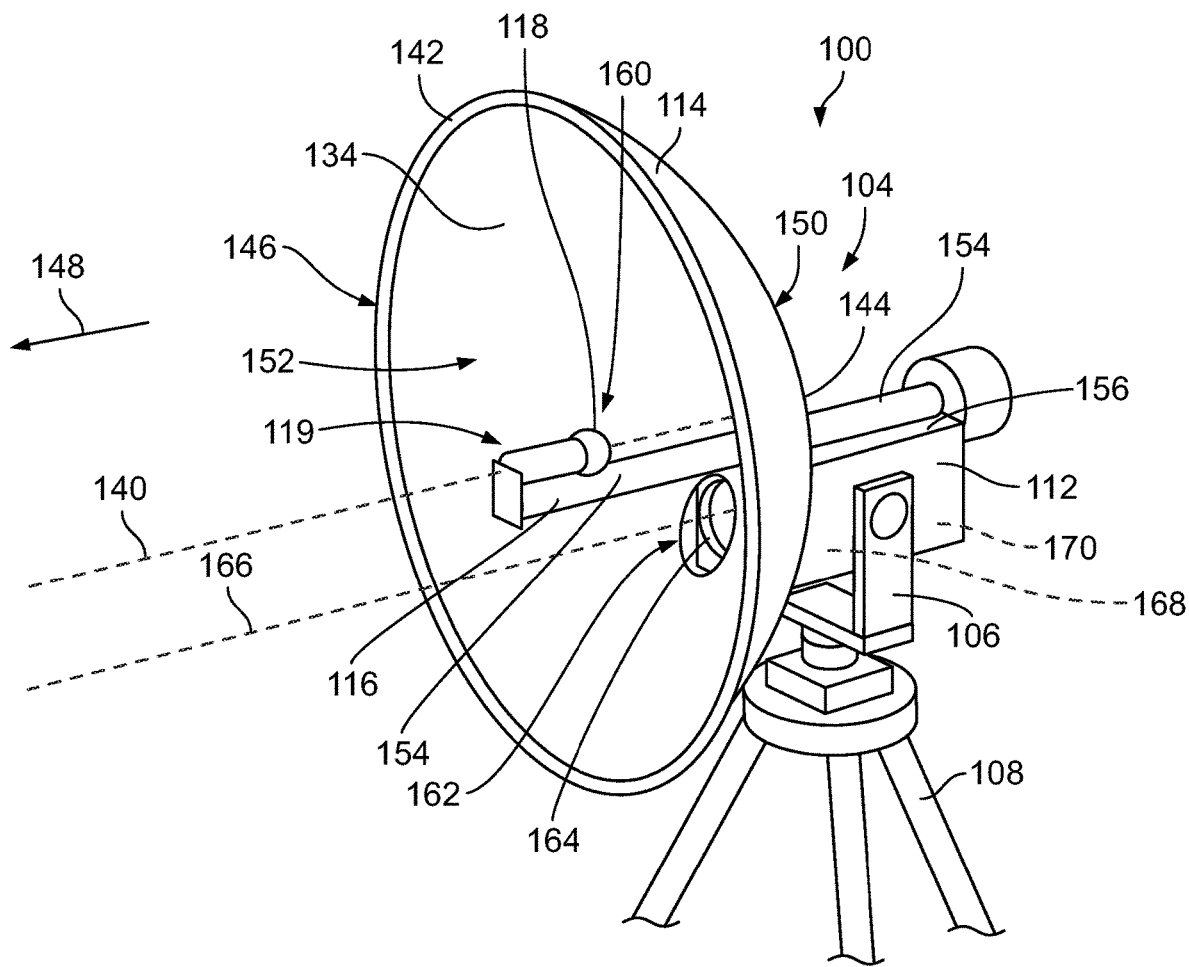
FIG. 2 is a perspective view of a portion of the audio instrument shown in FIG. 1A.

FIG. 1B illustrates a block diagram representing the audio instrument 100 according to the embodiment shown in FIG. 1A. The audio device 116 may include or represent a microphone for receiving sound and a speaker for transmitting sound. In some embodiments, the speaker and microphone are the same component. The audio device 116 is an assembly that includes the transducer element 118 and additional hardware and circuitry. The additional hardware includes a shaft 154 that holds the transducer element 118, as shown in FIG. 2.

The sensor unit 112 includes at least one sensor device, such as a distance measurement sensor (e.g. laser range finder), a camera, or the like. In the exemplary embodiment, the sensor unit 112 includes both a camera 168 and a distance measurement sensor 170 (both shown in FIG. 2). The camera 168 and the distance measurement sensor 170 can be commonly disposed within a case 156 (shown in FIG. 2) or separate with discrete cases or housings. The camera 168 may operate in the visible light range of the electromagnetic spectrum, the IR light range, the UV light range, and/or the like. The camera 168 generates image data, such as still images and/or video, based on light received at one or more lenses 164 thereof (shown in FIG. 2). The distance measurement sensor 170 measures linear distances between the sensor 170 and a target object. The distance measurement sensor 170 may be a laser range finder that emits a laser beam along or parallel to the sight axis 166 to determine the distance to a target object based on the time-of-flight principle or the like. The sensor unit 112 and the pan-tilt mechanism 106 may represent a 3-D measurement system that provides 3-D localization of the audio instrument 100.

The sensor unit 112, the parabolic reflector 114, and the audio device 116 are collectively referred to as the component assembly 104, which is aimed and oriented by the pan-tilt mechanism 106. The pan-tilt mechanism 106 includes motors to provide rotation movement. Optionally, the pan-tilt mechanism 106 includes discrete sensors (such as rotational encoders) that measure the rotation angle. Alternatively, the motors may have a built-in ability to measure the angle without the use of discrete sensors. For example, the motors may be stepper motors that are able to determine the angle based on a number of commanded input steps.

The control system 110 of the audio instrument 100 includes hardware circuitry that includes one or more processors 111 configured to operate based on programmed instructions. The one or more processors 111 include or represent one or more microprocessors, field programmable gate arrays, and/or integrated circuits. The programmed instructions may be stored on a data storage device (e.g., memory). The programmed instructions may dictate the functioning of the one or more processors 111 to perform the functions of the control system 110 described herein. The programmed instructions may represent software or may be hardwired logic. The control system 110 may be integrated within the audio instrument 100, such as within the case 156 (shown in FIG. 2) of the sensor unit 112. Alternatively, the control system 110 may be disposed within a device that connects to or plugs into the audio instrument 100.

In an embodiment, the one or more processors 111 perform different types of processes or functions, such as audio generation 202, audio analyzing 204, measurement processing 206, image processing 208, and motion control 210. Optionally, a single processor may perform all of these listed functions or multiple processors may perform these listed functions. For example, one of the processors may perform at least one different function than another of the processors. With respect to the motion control 210 function, the one or more processors 111 may be configured to generate control signals for reorienting the pan-tilt mechanism 106. The control signals may be communicated to the integrated motors within the pan-tilt mechanism 106 to move the pan-tilt mechanism 106. The other functions 202, 204, 206, and 208 are described in more detail herein.

The audio instrument 100 may also include an input/output (I/O) device 232 that is communicatively connected to the control system 110. The I/O device 232 may be integrated within the audio instrument 100 or connected to the audio instrument 100 via a wired or wireless connection. The I/O device 232 may include a display that displays a graphical user interface and one or more input elements, such as a touchpad, a touchscreen, a keyboard, a mouse, physical or virtual buttons, or the like. An operator may use the I/O device 232 to control the audio instrument 100, such as by selecting or inputting positional coordinates that are used to aim the component assembly 104 (including the parabolic reflector 114) to different specific locations within a three-dimensional space.

FIG. 2 is a perspective view of a portion of the audio instrument 100 shown in FIG. 1A. The parabolic reflector 114 includes an inner surface 134 that is oriented about a central axis 140 of the parabolic reflector 114. In at least one embodiment, the parabolic reflector 114 has a parabolic-based shape, which may include paraboloid shapes, such as an elliptic paraboloid. The parabolic reflector 114 extends along the central axis 140 from a rim 142 of the parabolic reflector 114 to a central point 144 of the parabolic reflector 114. The rim 142 extends along a perimeter of the parabolic reflector 114 and defines a front end 146 of the parabolic reflector 114 in a target-facing direction 148. The central point 144 is disposed along the central axis 140 at a rear end 150 of the parabolic reflector 114. The inner surface 134 is concave such that the inner surface 134 defines an internal volume 152 of the parabolic reflector 114 between the rim 142 and the central point 144.

The component assembly 104 may be fixed in location relative to the pan-tilt mechanism 106. The component assembly 104 may be mounted to the pan-tilt mechanism 106 via a shared mounting structure or housing. For example, one or more sensors of the sensor unit 112 may be housed within the case 156 that is secured to the pan-tilt mechanism 106 via one or more fasteners, such as bolts, screws, or the like. For example, the parabolic reflector 114, the audio device 116, and the sensor unit 112 may be rigidly secured (directly or indirectly) to the pan-tilt mechanism 106 to move with the pan-tilt mechanism 106. Optionally, a portion of the audio device 116 including the transducer element 118 may be extendable and/or retractable relative to the pan-tilt mechanism 106 in order to adjust the position of the audio transducer 118 relative to the focal point 160 of the parabolic reflector 114.

In the illustrated embodiment, the audio device 116 includes an elongated shaft 154 that is used to mount the audio device 116 to the pan-tilt mechanism 106. The shaft 154 is indirectly mounted to the pan-tilt mechanism 106 via a structure (such as the housing in some use cases) associated with the sensor unit 112 in the illustrated embodiment. For example, the shaft 154 may be bolted, welded, or otherwise secured to a case 156 of the sensor unit 112. The shaft 154 may extend through a bore 158 (shown in FIG. 3) of the parabolic reflector 114 such that a portion of the shaft 154 is within the internal volume 152 of the parabolic reflector 114 and another portion is behind the parabolic reflector 114. The transducer element 118 is disposed within the internal volume 152 and/or in front of the front end 146 of the parabolic reflector 114. In an embodiment, the shaft 154 and bore 158 are arranged such that the transducer element 118 aligns with the central axis 140 of the parabolic reflector 114. For example, the shaft 154 may be oriented parallel to the central axis 140. The bore 158 that accommodates the shaft 154 may be located at or proximate to the central point 144 of the parabolic reflector 114. The transducer element 118 may be located at or proximate to a focal point 160 (or focus) of the parabolic reflector 114.

In the illustrated embodiment, the sensor unit 112, the pan-tilt mechanism 106, and the support structure 108 are located behind the parabolic reflector 114 (relative to the target-facing direction 148). The parabolic reflector 114 contains (e.g., defines) an access opening 162 through a thickness thereof. One or more lenses 164 of the sensor unit 112 (e.g., the camera) align with the access opening 162 and receive electromagnetic energy (e.g., visible light, infrared (IR) light, reflected laser beams, etc.) through the access opening 162. The access opening 162 and the sensor unit 112 may be offset (e.g., spaced apart) from the bore 158 and the shaft 154. For example, the access opening 162 and the sensor unit 112 are disposed below the bore 158 and the shaft 154 in the illustrated embodiment. The offset positioning allows both the audio device 116 and the sensor unit 112 to focus towards a designated target without obstruction or interference between the different modalities. For example, the sensor unit 112 focuses along a sight axis 166 that is offset from the shaft 154 and the central axis 140 of the parabolic reflector 114. The sight axis 166 may be parallel to the central axis 140. In an embodiment, the parabolic reflector 114 is fixed in place relative to the sensor unit 112, such that the central axis 140 and the sight axis 166 move in common based on reorienting of the pan-tilt mechanism 106.

Figure 3:
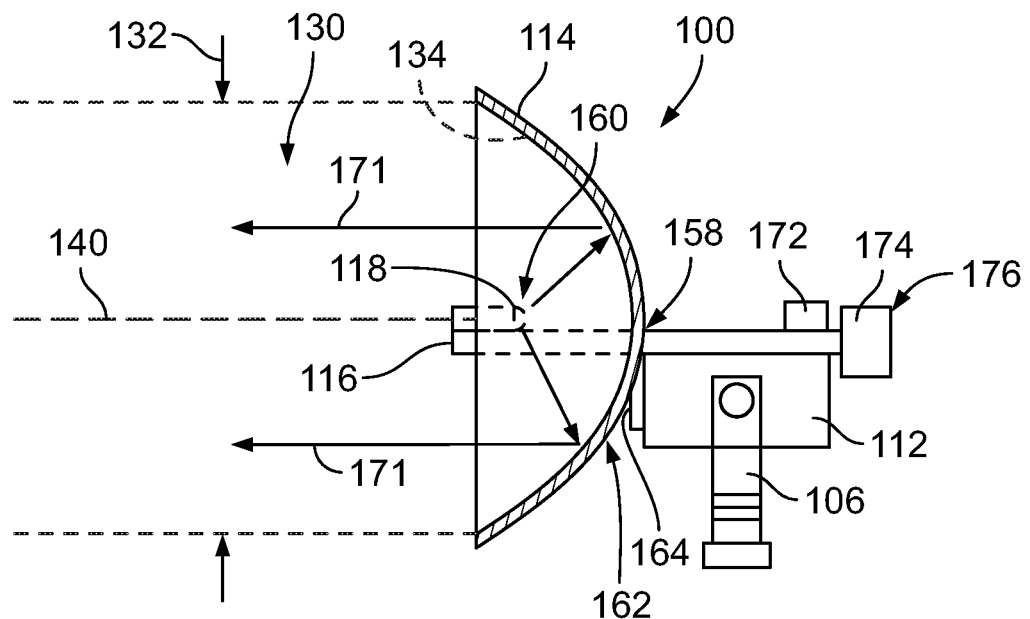
FIG. 3 is a side view of the audio instrument shown in FIGS. 1A and 2.

FIG. 3 is a side view of the audio instrument 100 shown in FIGS. 1 and 2 (e.g., FIGS. 1A, 1B, and 2). The audio instrument 100 transmits sound by emitting sound waves from the transducer element 118 and redirecting at least some of the emitted sound waves via the parabolic reflector 114. The arrows 171 in FIG. 3 represent propagation directions of the sound waves for descriptive purposes. The transducer element 118 in FIG. 3 is positioned at the focal point 160 of the parabolic reflector 114. The transducer element 118 generates a substantially spherical wave that reflects off the parabolic reflector 114 into a wave propagating similar to a collimated beam along the central axis 140 of the parabolic reflector 114. The wave causes the envelope 130 to have a relatively uniform width 132 extending from the parabolic reflector 114. Although not shown in FIG. 3, the audio instrument 100 receives sound waves that reflect or bounce off the inner surface 134 of the parabolic reflector 114 towards the focal point 160, where the transducer element 118 is located, and causes the transducer element 118 to vibrate.

As shown in FIG. 3, the pan-tilt mechanism 106 and the sensor unit 112 are disposed behind the parabolic reflector 114 outside of the envelope 130. Optionally, a minor portion of the sensor unit 112 including the one or more lenses 164 may extend at least partially through the access opening 162 of the parabolic reflector 114.

In an embodiment, the transducer element 118 may be translatable relative to the parabolic reflector 114 to adjust the width 132 of the communication envelope 130. For example, the audio device 116 may include or be connected to an actuator 172. The actuator 172 is controlled by the one or more processors 111 of the control system 110 (shown in FIG. 1B) to linearly move the transducer element 118 relative to the parabolic reflector 114. For example, the one or more processors 111 (associated with motion control 210) may generate control signals that are communicated to the actuator 172 to move the transducer element 118 along a path that is collinear with the central axis 140. The actuator 172 may be a linear actuator that includes an electric motor, such as a step motor, servo, or the like. The audio device 116 may include a counterweight 174 at an end 176 opposite the transducer element 118 for balance.

Figure 4:
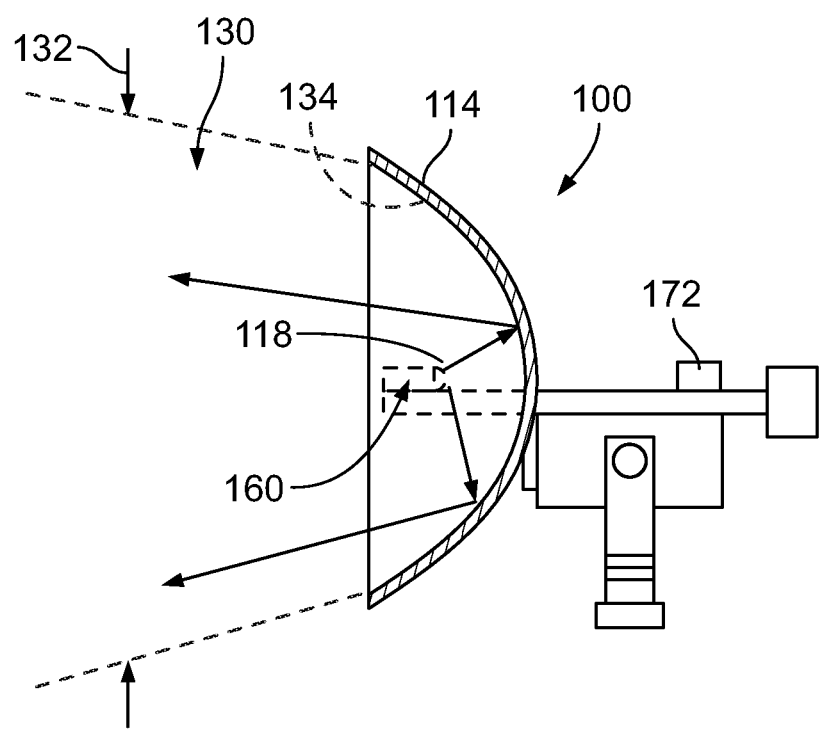
FIG. 4 illustrates the side view of the audio instrument as shown in FIG. 3 with a transducer element in a different position relative to a parabolic reflector than the position shown in FIG. 3.

FIG. 4 illustrates the side view of the audio instrument 100 as shown in FIG. 3 with the transducer element 118 disposed closer to the inner surface 134 of the parabolic reflector 114 relative to the position shown in FIG. 3. Because the transducer element 118 is offset from the focal point 160, the sound waves emitted from the transducer element 118 reflect from the parabolic reflector 114 along the envelope 130. The width 132 of the envelope 130 is wider in FIG. 4 than in FIG. 3 due to the modified positioning of the transducer element 118 relative to the parabolic reflector 114. The wider envelope 130 may be preferred for some communication tasks, such as communicating with multiple people at different locations within a target area, instead of communicating with a single person or object at a single location. The actuator 172 may be controlled to move the transducer element 118 farther away from the inner surface 134 of the parabolic reflector 114 to narrow the communication envelope 130.

Figure 5:
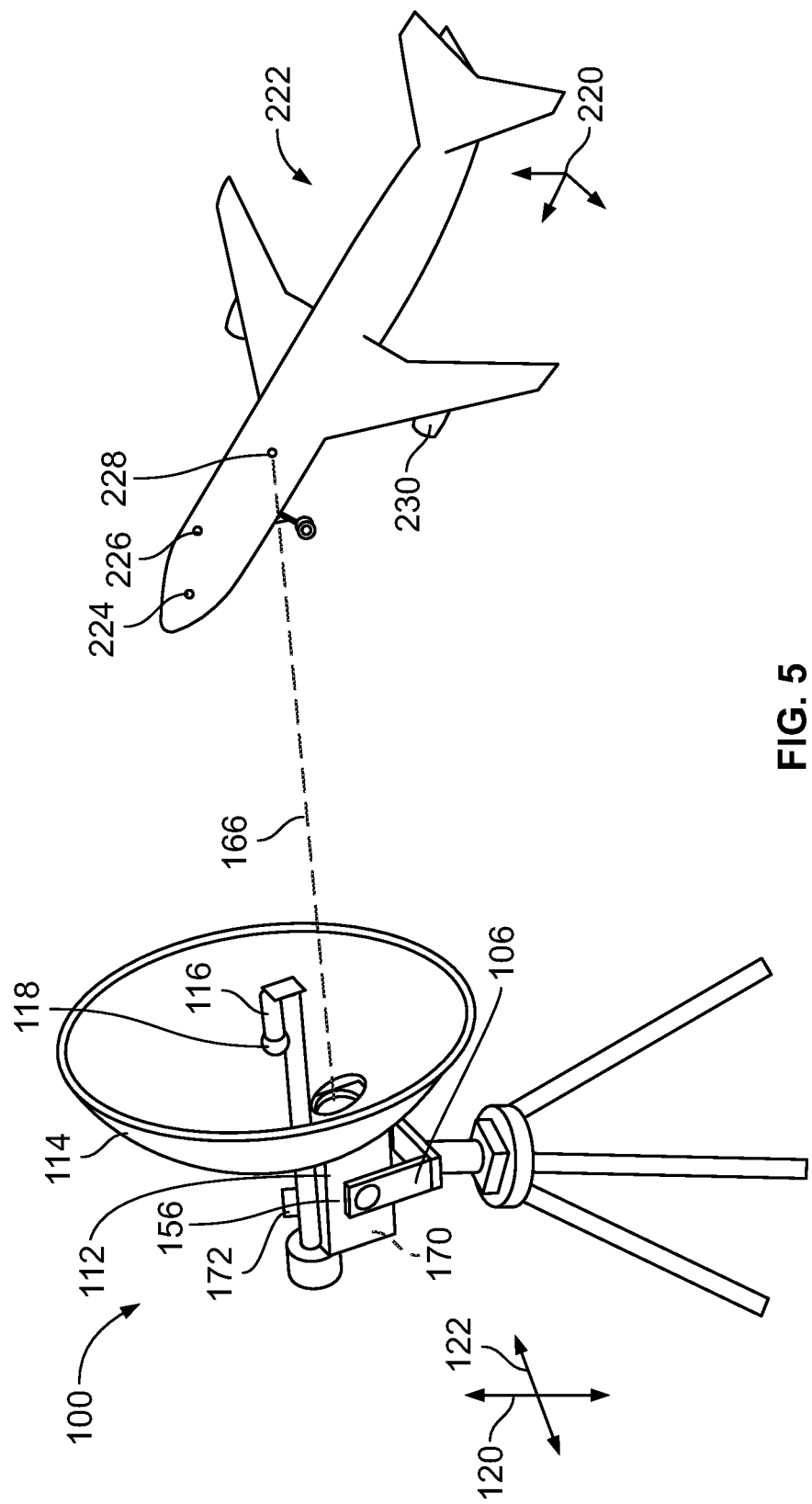
FIG. 5 illustrates the audio instrument during a location calibration stage according to an embodiment of the present disclosure.

FIG. 5 illustrates the audio instrument 100 during a location calibration stage according to an embodiment. In one or more embodiments, the audio instrument 100 is configured to direct sound to and/or receive sound from a specific 3-D location in space for targeted and focused audio communication between the audio device 116 and a target at the specific 3-D location. The 3-D location may be characterized by positional coordinates defined in a target coordinate system. The audio instrument 100 may be able to transmit sound directly to a desired 3-D location within the target coordinate system by controlling the pan-tilt mechanism 106 based on input positional coordinates to point the parabolic reflector 114 towards the desired 3-D location. Conversely, the audio instrument 100 may be able to determine the positional coordinates (defined within the target coordinate system) of a detected audio source of previously unknown location based on the orientation of the pan-tilt mechanism 106 and distance to the target measured by a distance measurement sensor 170 at the time that the audio device 116 receives the sound from the audio source. In order to determine positional coordinates of received sounds and to transmit sounds to specific positional coordinates, the audio instrument 100 performs a location calibration protocol to determine the relative location of the audio instrument 100 with respect to the target coordinate system.

In an embodiment, the one or more processors 111 (associated with the measurement processing 206 shown in FIG. 1B) of the audio instrument 100 are configured to calibrate the location of the audio instrument 100 to a target coordinate system 220 of a target 222. In the illustrated embodiment, the target 222 is an airplane. The location calibration protocol may be performed based on at least three visible non-collinear calibration points 224, 226, 228 of the target 222 having known positional coordinates (x, y, z) in the target coordinate system 220. The pan-tilt mechanism 106 is moved to sequentially cause the sight axis 166 of the sensor unit 112 to align with each of the calibration points 224, 226, 228. The sensor unit 112 is pointed at the calibration point 228 in FIG. 5. As each position, the angular rotation of the pan-tilt mechanism 106 about both the horizontal axis 122 and the vertical axis 120 is recorded, as well as a measured distance to each of the points 224, 226, 228 as determined by the laser range finder 170. Three data values are be recorded for each calibration point 224, 226, and 228, resulting in position data points defined in spherical coordinates.

Then, the one or more processors 111 use a spherical coordinate to Cartesian coordinate transformation process to convert the three recorded spherical coordinate points (each with a distance value, pan angle, and tilt angle), into Cartesian (x, y, z) position data, each with its own x, y, z coordinate components (nine data values in total). The calibration process then compares the Cartesian representation of the recorded data points to the known positional coordinates (x, y, z) of the corresponding points in the target coordinate system 220. The result of this comparison computation is a transfer function, which may be in the form of a homogeneous transformation matrix, which will then be used for conversion of any additional data points measured by the instrument into point positions defined in the coordinate system of the target. In addition, the inverse of the transformation matrix can be used with a process to perform the reverse computation to convert specified Cartesian point positions defined in the coordinate system of the target into spherical coordinates in order to direct the instrument to aim at corresponding points in the physical target environment.

Using the resulting transfer function (which many be in the form of a homogeneous transformation matrix), the control system 110 is able to point the audio instrument 100 to specific locations of the target 222 based on input positional coordinates. For example, if the positional coordinates of a specific portion of the airplane is known, such as the center of an engine 230, the control system 110 can aim the parabolic reflector 114 to listen to the engine 230 for monitoring purposes. The coordinates of the engine 230 may be known based on a computer-aided design or the like. The control system 110 applies the transfer function to the coordinates and then determines how the pan-tilt mechanism 106 should be reoriented to point the central axis 140 (shown in FIGS. 2 and 3) of the parabolic reflector 114 directly to the engine 230. An operator may use the I/O device 232 (shown in FIG. 1B) to select or input positional coordinates that are used to aim the parabolic reflector 114 to different specific locations of the target 222. The airplane shown in FIG. 5 is just one non-limiting example target, and various other types of targets may be used as described in the following example use cases.

In a first non-limiting use case mentioned above, the audio instrument 100 can be controlled to monitor a sound-emitting target, such as a target object, over time. For example, the target may be a gas turbine engine. Based on a known position of a specific component, such as a bearing, within the target coordinate system 220, the positional coordinates of the component are used by the control system 110 to reorient the pan-tilt mechanism 106 for pointing the parabolic reflector 114 directly at the component, regardless of the distance between the instrument 100 and the target component. The instrument 100 may record an audio clip of the sound received from the target component, via the parabolic reflector 114 and audio device 116, over a first time period. The control system 110 may store the audio clip in a local storage device or in a remote storage device. Because the positioning of the instrument 100 is based on positional coordinates of the target coordinate system 220, the positioning is accurate and precise, as well as repeatable.

At a later time, the control system 110 controls the parabolic reflector 114 to once again point directly at the component, and the instrument 100 records and stores an audio clip of the sound received from the component during the subsequent, second time period. Additional audio clips may be recorded during other time periods. The one or more audio processors 208 may analyze and compare the audio clips to determine how the sound emitted by the component varies over time. Such audio analysis could be used to determine when a component, such as a bearing, should be replaced or scheduled for maintenance, possibly even while the component is still functional. Using the instrument 100 to monitor a target object over time can provide improved and/or earlier detection of equipment-related problems, such as indications that a part is damaged or wearing, which can signal the need for preventative maintenance.

Figure 6:
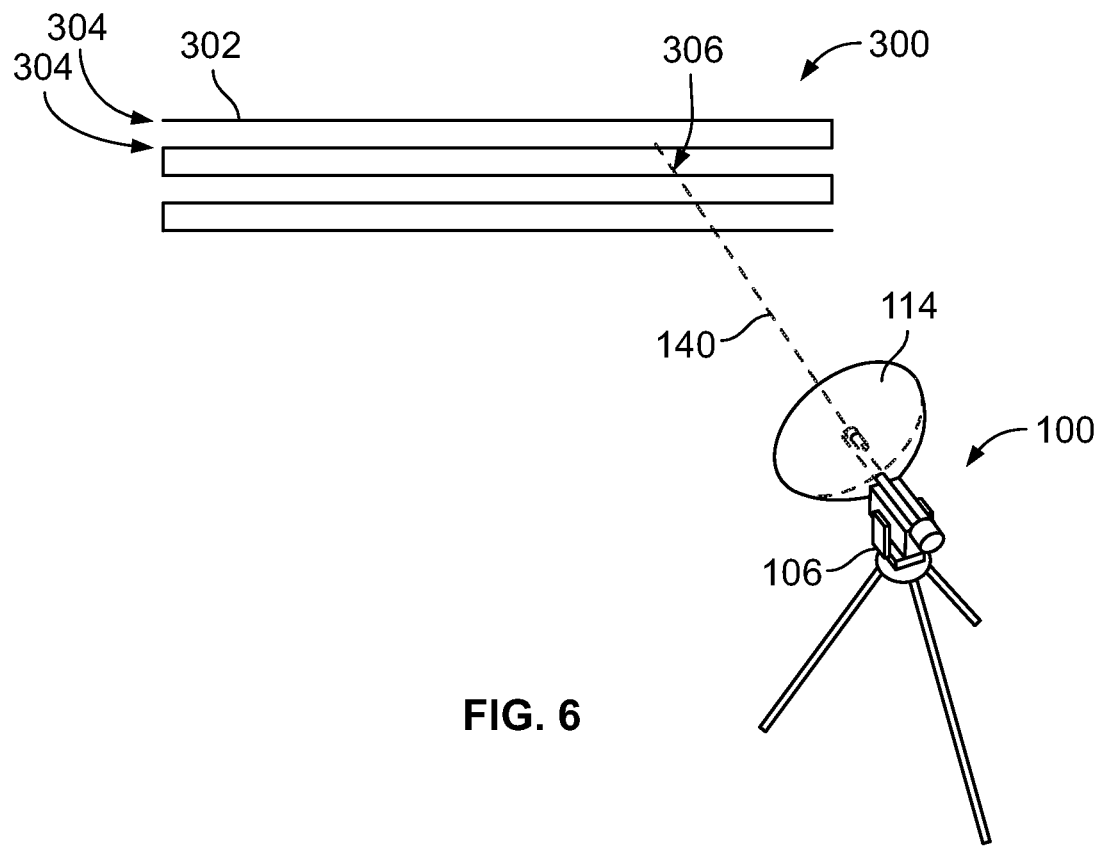
FIG. 6 illustrates the audio instrument performing a scanning operation of along a target according to an embodiment of the present disclosure.

A second non-limiting use case is described with reference to FIG. 6, which illustrates the audio instrument 100 performing a scanning operation of along a target 300. Because the pan-tilt mechanism 106 can accurately point the parabolic reflector 114 to specific, precise locations in space based on positional coordinates, the instrument 100 can perform a scan of the target 300 to listen for one or more audio signatures emitted from a location of the target 300. For example, the coordinates of the target 300 may be uploaded or access by the control system 110, which generates a scan path 302. In the illustrated embodiment, the scan path 302 is serpentine and extends the length of one row 304 before moving to an adjacent row 304 and returning in the opposite direction. The movement controller 202 controls the pan-tilt mechanism 106 to orient the parabolic reflector 114 such that the central axis 140 thereof gradually follows the scan path 302.

During the scan, the audio device 116 receives sounds and the one or more audio processors 208 analyze the sounds for detecting one or more designated audio signatures, which may be stored. If the audio processors 208 detect the presence of one of the designated audio signatures, the control system 110 knows the orientation of the parabolic reflector 114 at which the audio signature was captured. Based on the orientation of the parabolic reflector 114 and the transfer function, for example, the control system 110 can calculate the positional coordinates of a source location 306 of the audio signature within the target 300.

In a non-limiting example, the target 300 may be a department store, amusement park, arena, or the like, and the scan is performed to locate specific sounds, such as the sound of crying which could be associated with a lost child. Upon detecting a crying child based on the audio signature of the crying sound, the control system 110 can be configured to generate a notification message that notifies an operator of the location of the crying child within the target 300. In another example, the target 300 may be an industrial machine, such as an engine. The scan may be performed to thoroughly and methodically search the machine for audio signatures that are associated with different properties, such as broken or worn parts, operating conditions outside of expected ranges, or the like. For example, a scan of an industrial machine could identify parts that may need replacement and/or maintenance without replacing or working on parts that are in satisfactory condition.

In a third non-limiting use case, the audio instrument 100 can be used to transmit sounds for directing information to specific locations in a target coordinate system. For example, the target coordinate system may be within an industrial facility or site, such as a factory, manufacturing plant, power plant, construction site, or the like. The facility or site may render communications between individuals relatively difficult without the use of handheld radio transceivers or mobile phones due to long distances between the individuals and/or loud noises from equipment. The audio instrument 100 may be used to communicate audio messages to people in such facilities or sites without the use of handheld radio transceivers or mobile phones. The instrument 100 may be mounted overhead, such as on a crane, a ceiling beam, or the like. From such a vantage point, the instrument 100 can direct audio messages to specific locations for various purposes. In one non-limiting example, the instrument 100 can provide warning messages. For example, the control system 110 may control the pan-tilt mechanism 106 to point the parabolic reflector 114 to an area that is associated with a hazard or potentially hazardous condition, based on positional coordinates of that area in the target coordinate system. The area can be potentially hazardous due to a spill, the movement of construction equipment, vehicles, or factory machinery, or the like. Once in position, the control system 110 may control the audio device 116 to emit sounds that represent the warning messages, which are directed by the parabolic reflector 114 to the area. The warning message may warn people in the vicinity of the area about the hazard. In addition to, or instead of, transmitting a warning, the instrument 100 can also listen for sounds emitted within that area, such as sounds indicative of a fall, an injury, a spill, or the like.

In another example, the instrument 100 can exchange other information besides warnings to target objects, such as people or machines, located at specific positions in the target coordinate system. If a target object moves from the specific position to which the parabolic reflector 114 is pointed before the instrument 100 completes the communication, the instrument 100 according to one or more embodiments may pivot to track the target object. For example, if the route of the target object is known, such as a scheduled route of an automated vehicle or machine, then the control system 110 may control the pan-tilt mechanism 106 to reorient the parabolic reflector 114 such that the central axis 140 thereof remains pointed at the target object as the target object moves to enable continued transmitting and/or receiving of sound waves between the instrument 100 and the target object. In another example, the instrument 100 may employ image-based tracking of the moving target object based on image data generated by the sensor unit 112. For example, the camera 168 within the sensor unit 112 generates image data that depicts the target object while the parabolic reflector 114 is pointed at the target object. The movement of the target object over time within the image data can be analyzed by the one or more image processors 206 of the control system 110. The movement controllers 202 may communicate with the image processors 206 to determine the direction of movement of the target object, and to reorient the parabolic reflector 114 via the pan-tilt mechanism 106 to track such movement.

Figure 7:
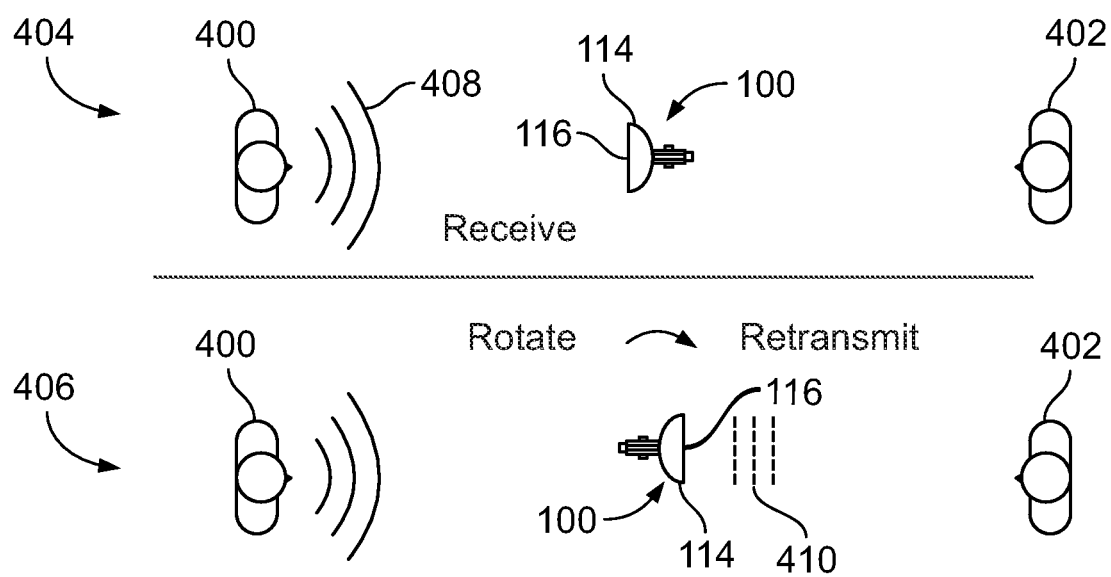
FIG. 7 illustrates the audio instrument serving as a relay between two parties for bi-directional communication according to an embodiment.

Another use case is shown in FIG. 7, which illustrates the audio instrument 100 serving as a relay between two parties 400, 402 for bi-directional communication. FIG. 7 is split into a first, receive stage 404 and a second, retransmit stage 406. In the receive stage 404, the parabolic reflector 114 points to a first party 400 and receives sound waves 408 emitted from the first party 400. The first party 400 may be a first person, and the sound waves 408 may represent an audio message, such as a voice message. The instrument 100 receives the audio message 408 from the first person 400 via the audio device 116 and at least temporarily stores the audio message 408 as an audio clip. Then, the control system 110 controls the pan-tilt mechanism 106 to reorient the parabolic reflector 114 to point towards the second party 402, which may be a second person. In the transmit stage 406, the audio device 116 functions as a speaker and transmits the audio message to the second person 402. The audio message is transmitted as a substantially collimated wave 410 to the second person 402.

In an embodiment, the control system 110 of the audio instrument 100 may incorporate speech recognition for controlling the audio instrument 100 based on speech commands. For example, the one or more processors 111 may be configured to interpret received speech commands and take responsive action to the speech commands based on the content of the commands. In the illustrated embodiment, the sound waves 408 emitted from the first party 400 during the receive stage 404 may include a speech command to inform the control system 110 to transmit the audio message. For example, the first party 400 may say a keyword that indicates that the audio message from the first party 400 is complete and that the audio instrument 100 should reorient and transmit the audio message to the second party 402. In a non-limiting example, the keyword may be "over", "transmit", or the like.

Controlling the instrument 100 to function as a communication relay may be useful to facilitate communications between people at different locations of a facility where direct communication is difficult due to large distances between the people and/or a loud environment. Furthermore, because the instrument 100 uses the parabolic reflector 114 to focus the sound-receiving and sound-transmission, the parties 400, 402 may be able to communicate with each other across relatively large distances and in relatively loud environments without the people involved in the conversation expending excessive energy to talk (e.g., without shouting). In another embodiment, instead of controlling a single audio instrument 100 to rotate from facing the first party 400 to facing the second party 402, and vice-versa (as shown in FIG. 7), the relay functionality may be achieved using two audio instruments 100 communicatively connected together, such as via an electrical cable. One instrument 100 is controlled to face the first party 400, and the other instrument 100 faces the second party 402.

Figure 8:
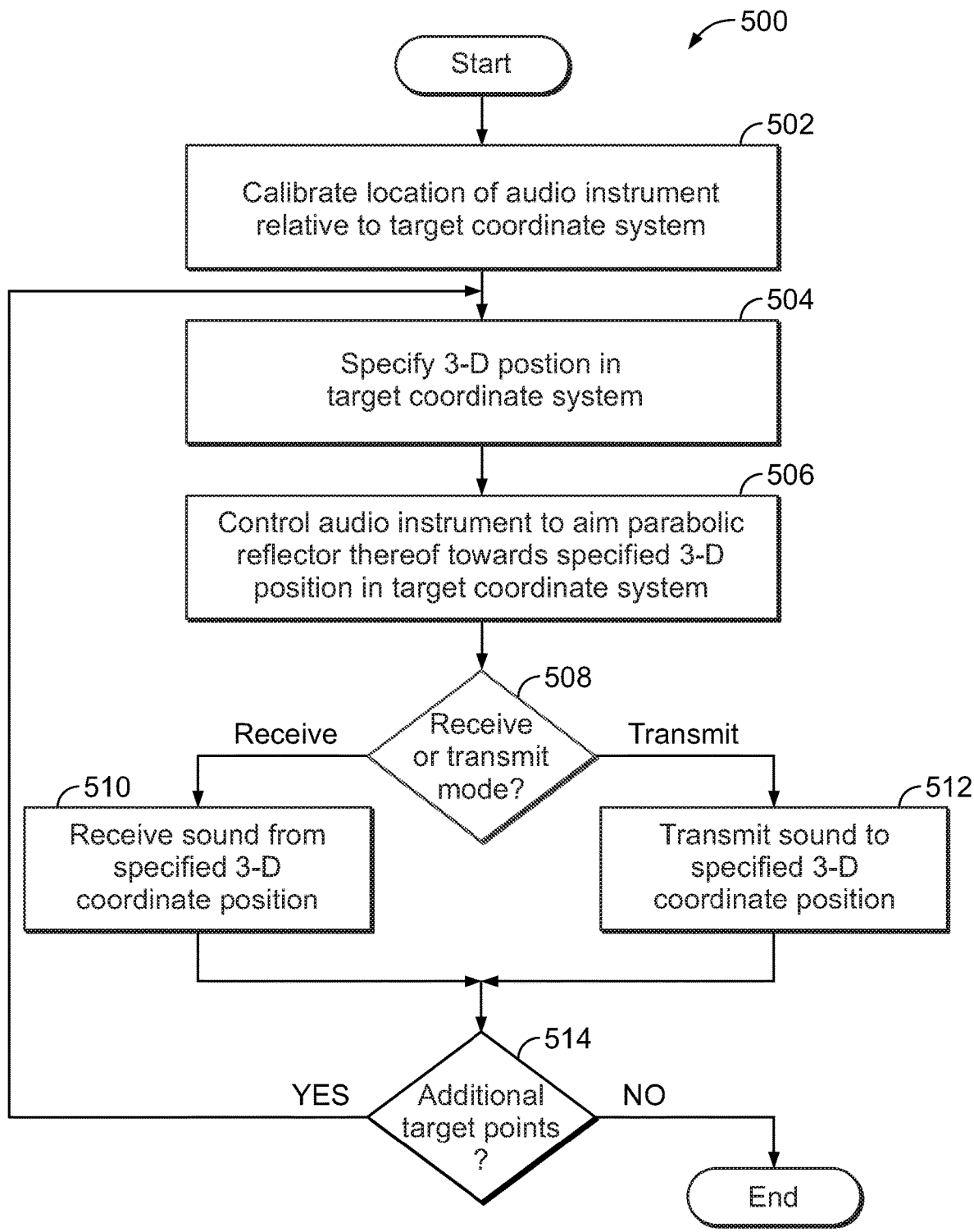
FIG. 8 is a flow chart of a method for targeted audio communications according to an embodiment.

FIG. 8 is a flow chart of a method 500 for targeted audio communications according to an embodiment. The method 500 may be performed by the audio instrument 100 described in FIGS. 1A through 7. At 502, the location of an audio instrument is calibrated relative to a target coordinate system. The calibration is based on respective orientations of a pan-tilt mechanism and measured distances of the audio instrument while a sensor unit of the audio instrument is sequentially directed to each of at least three visible calibration point positions within the target coordinate system. For example, the pan-tilt mechanism is controlled to sequentially aim a distance measurement sensor of the audio instrument towards the calibration point positions to measure respective linear distances between the distance measurement sensor and each of the calibration point positions.

At 504, a three-dimensional (3-D) position defined in the target coordinate system is specified. For example, the specified 3-D position may be input by an operator of the audio instrument 100 using an I/O device or by providing a speech-based command. Alternatively, the 3-D position may be specified based on programmed instructions. At 506, the audio instrument is controlled to aim a parabolic reflector thereof towards the specified 3-D position in the target coordinate system. For example, the pan-tilt mechanism is controlled, via one or more processors of a (motion) control system, to orient the parabolic reflector such that a central axis of the parabolic reflector aims or points toward the specified (e.g., specific) 3-D position defined in the target coordinate system. At 508, a determination is made whether the audio instrument is in a receive mode or a transmit mode. If in the receive mode, the method 500 proceeds to 510 and sound emitted from the specified 3-D coordinate position is received by the audio instrument. For example, the parabolic reflector aimed towards the specified coordinate position is able to focus sound received from the specified coordinate position towards a transducer element of the audio instrument. If in the transmit mode, the method 500 proceeds to 512 and sound is transmitted from the audio instrument to the specified 3-D coordinate position. For example, sound generated and emitted by the transducer element may be directed by the parabolic reflector towards the specified coordinate position. The method 500 may include only one or both of the steps 510, 512.

At 514, a determination is made whether to target additional points for receiving and/or transmitting sound. If so, the method 500 returns to 504 and another 3-D position defined in the target coordinate system is specified. Optionally, the method 500 may include controlling the pan-tilt mechanism to point the central axis of the parabolic reflector towards different coordinate positions in the target coordinate system over time along a designated scan path, analyzing sounds received at the different coordinate positions to detect a presence of a designated audio signature, and determining a coordinate position of a source location at which the designated audio signature is detected. Optionally, the specific coordinate position is associated with a target object, and the method 500 includes controlling the pan-tilt mechanism to reorient the parabolic reflector for tracking movement of the target object based on image data generated by the camera 168 within the sensor unit 112. If it is determined at 514 that there are no additional points to target, the method 500 ends.

The audio instrument according to embodiments described herein has the ability to be aimed at an environment-specific 3-D coordinate location for transmitting and/or receiving audio. The audio instrument may be configured to determine a 3-D coordinate location of a sound-producing target object. The audio instrument may also be configured to dynamically track movement of a target object through space while maintaining the target object within a focus of the parabolic reflector. Furthermore, the audio instrument may enable communication exchanges between parties over distances without the use of handheld radio transceivers, mobile phones, or any other devices at the locations of the parties.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are example embodiments. Many other embodiments will be apparent to those of ordinary skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. An audio instrument comprising:
    a component assembly including a parabolic reflector, an audio device, and a sensor unit, the audio device configured to one or more of receive or transmit sound waves via a transducer element of the audio device disposed within a communication envelope of the parabolic reflector, the sensor unit including a distance measurement sensor;
    a pan-tilt mechanism configured to orient the component assembly at independent angular rotations about two orthogonal axes relative to a support platform; and
    one or more processors communicatively connected to the pan-tilt mechanism and the component assembly, the one or more processors configured to control the pan-tilt mechanism to orient the component assembly such that a central axis of the parabolic reflector is aimed towards a specific three-dimensional location for targeted audio communication between the audio device and a target at the specific three-dimensional location.

2. The audio instrument of claim 1, wherein the one or more processors are configured to calibrate a location of the component assembly to a target coordinate system by controlling the pan-tilt mechanism to orient the component assembly such that the distance measurement sensor is sequentially aimed towards at least three calibration point positions within the target coordinate system to measure respective linear distances between the distance measurement sensor and each of the calibration point positions.

3. The audio instrument of claim 2, wherein the specific three-dimensional location represents a coordinate position defined in the target coordinate system.

4. The audio instrument of claim 1, wherein the sensor unit includes a camera, and the one or more processors are configured to automatically control the pan-tilt mechanism to reorient the component assembly for tracking movement of the target based on image data generated by the camera.

5. The audio instrument of claim 1, wherein the target is a first party and the one or more processors are configured to receive an audio message from the first party via the audio device while the parabolic reflector points towards the first party, and
    wherein the one or more processors are configured to control the pan-tilt mechanism to reorient the component assembly to point the central axis of the parabolic reflector towards a second party at a different three-dimensional location, and to transmit the audio message via the audio device towards the second party.

6. The audio instrument of claim 1, wherein the parabolic reflector contains an access opening through a thickness of the parabolic reflector, and the sensor unit includes a camera having one or more lenses that align with the access opening.

7. The audio instrument of claim 6, wherein the audio device includes an elongated shaft that is mounted to the pan-tilt mechanism, the parabolic reflector containing a bore through the thickness of the parabolic reflector, the bore spaced apart from the access opening and receiving the shaft of the audio device therethrough.

8. The audio instrument of claim 1, wherein the transducer element of the audio device is held in alignment with the central axis of the parabolic reflector, and the component assembly further includes a transducer actuator that is configured to linearly move the transducer element relative to the parabolic reflector along the central axis.

9. The audio instrument of claim 1, wherein the parabolic reflector is oriented relative to the distance measurement sensor such that the central axis of the parabolic reflector is offset from and parallel to a sight axis of the distance measurement sensor.

10. The audio instrument of claim 1, wherein the audio device is configured to emit sound from the transducer element and to receive sound at the transducer element.

11. The audio instrument of claim 1, wherein the pan-tilt mechanism and the sensor unit are disposed rearward of the parabolic reflector outside of the communication envelope.

12. The audio instrument of claim 1, wherein distance measurement sensor is a laser range finder and the sensor unit also includes a camera.

13. The audio instrument of claim 1, wherein the one or more processors are configured to control the pan-tilt mechanism to aim the central axis of the parabolic reflector towards different coordinate positions, defined in the target coordinate system, over time along a designated scan path within an area to detect one or more audio signatures emitted from the area.

14. An audio instrument comprising:
a component assembly including a distance measurement sensor, a parabolic reflector, and an audio device, the audio device configured to one or more of receive or transmit sound waves via a transducer element of the audio device disposed within a communication envelope of the parabolic reflector;
a pan-tilt mechanism configured to orient the component assembly at independent angular rotations about two orthogonal axes relative to a support platform for targeted audio communications,
wherein the parabolic reflector is fixed in location relative to the distance measurement sensor and is oriented relative to the distance measurement sensor such that a central axis of the parabolic reflector is offset from and parallel to a sight axis of the distance measurement sensor.

15. The audio instrument of claim 14, further comprising one or more processors communicatively connected to the pan-tilt mechanism and the component assembly and configured to control the pan-tilt mechanism to orient the component assembly such that the central axis of the parabolic reflector is aimed towards a specific three-dimensional location for targeted audio communication between the audio device and a target at the specific three-dimensional location.

16. The audio instrument of claim 14, wherein the parabolic reflector contains an access opening through a thickness of the parabolic reflector, wherein the sight axis of the distance measurement sensor aligns with the access opening of the parabolic reflector.

17. The audio instrument of claim 14, wherein the transducer element of the audio device is held in alignment with the central axis of the parabolic reflector, and the component assembly further includes a transducer actuator that is configured to linearly move the transducer element relative to the parabolic reflector along the central axis.

18. A method comprising:
calibrating a location of an audio instrument to a target coordinate system by controlling a pan-tilt mechanism of the audio instrument to sequentially aim a distance measurement sensor of the audio instrument towards at least three calibration point positions within the target coordinate system to measure respective linear distances between the distance measurement sensor and each of the calibration point positions;
controlling, via one or more processors, the pan-tilt mechanism to orient a parabolic reflector of the audio instrument such that a central axis of the parabolic reflector is aimed towards a specific coordinate position defined in the target coordinate system; and
one or more of (i) receiving sound emitted from the specific coordinate position at the audio instrument or (ii) transmitting sound from the audio instrument to the specific coordinate position.

19. The method of claim 18, further comprising controlling the pan-tilt mechanism to aim the central axis of the parabolic reflector towards different coordinate positions, defined in the target coordinate system, over time along a designated scan path;
analyzing sounds received at the audio instrument to detect a presence of a designated audio signature; and
determining a coordinate position, defined in the target coordinate system, of a source location towards which the central axis of the parabolic reflector is pointed at a time that the designated audio signature is detected.

20. The method of claim 18, wherein the specific coordinate position is associated with a target object and the method further includes controlling the pan-tilt mechanism to reorient the parabolic reflector for tracking movement of the target object based on image data generated by a camera of the audio instrument.

21. The method of claim 18, further comprising recording sounds emitted from the specific coordinate position during a first time period;
recording sounds emitted from the specific coordinate position during a second time period that is subsequent to the first time period; and
comparing the sounds recorded during the first time period to the sounds recorded during the second time period.

22. The method of claim 18, wherein the specific coordinate position is associated with a hazard, and the method includes transmitting sound representing a warning message from the audio instrument to the specific coordinate position to warn people in the vicinity of the hazard.

23. The method of claim 18, wherein the specific coordinate position is a first specific coordinate position and the method includes receiving sound emitted from a first party located at the first specific coordinate position, the method further comprises:
storing the sound that is received from the first party as an audio clip;
controlling the pan-tilt mechanism to orient the parabolic reflector of the audio instrument such that the central axis is aimed towards a second specific coordinate position defined in the target coordinate system and spaced apart from the first specific coordinate position; and
transmitting sound representing the audio clip from the audio instrument to the second specific coordinate position.

* * * * *